United States Patent [19]

Leitzke

[11] Patent Number: 4,981,656
[45] Date of Patent: Jan. 1, 1991

[54] DEVICE FOR THE PRODUCTION OF OZONE

[75] Inventor: Ortwin Leitzke, Kaarst, Fed. Rep. of Germany

[73] Assignee: Wedeco Gesellschaft fur Entkeimungsanlagen mbH, Herford, Fed. Rep. of Germany

[21] Appl. No.: 459,715

[22] PCT Filed: May 31, 1989

[86] PCT No.: PCT/DE89/00367
§ 371 Date: Jan. 19, 1990
§ 102(e) Date: Jan. 19, 1990

[87] PCT Pub. No.: WO89/12021
PCT Pub. Date: Dec. 14, 1989

[30] Foreign Application Priority Data

Jun. 3, 1988 [DE] Fed. Rep. of Germany ....... 3819304

[51] Int. Cl.$^5$ .............................................. B01J 19/08
[52] U.S. Cl. ............................ 422/186.18; 422/186.21
[58] Field of Search ....................... 422/186.18, 186.21

[56] References Cited

U.S. PATENT DOCUMENTS

| | | | |
|---|---|---|---|
| 4,693,870 | 9/1987 | Gloor et al. | 422/186.19 |
| 4,764,349 | 9/1988 | Arff et al. | 422/186.18 |
| 4,774,002 | 9/1988 | Heinemann | 422/186.19 |
| 4,908,189 | 3/1990 | Staubach | 422/186.19 |

Primary Examiner—Stephen J. Lechert, Jr.
Assistant Examiner—Nina Bhat
Attorney, Agent, or Firm—Collard, Roe & Galgano

[57] ABSTRACT

Device for the production of ozone from oxidized gases by means of silent electrical discharge in an intermediate chamber through which said gas has passed, which chamber is formed by an annular external electrode and a voltage-conducting internal electrode which is surrounded concentrically by said external electrode. A dielectric is arranged between the internal and the external electrode.

In order to increase the degree of efficiency of such a device and, at the same time, to enable utilization of lower voltages, the internal electrode consists of a polygonal bar or polygonal tube having more than four longitudinal edges. The ratio of the diameter of the external electrode to the largest diameter of the internal electrode is not greater than two.

3 Claims, 1 Drawing Sheet

U.S. Patent  Jan. 1, 1991  4,981,656
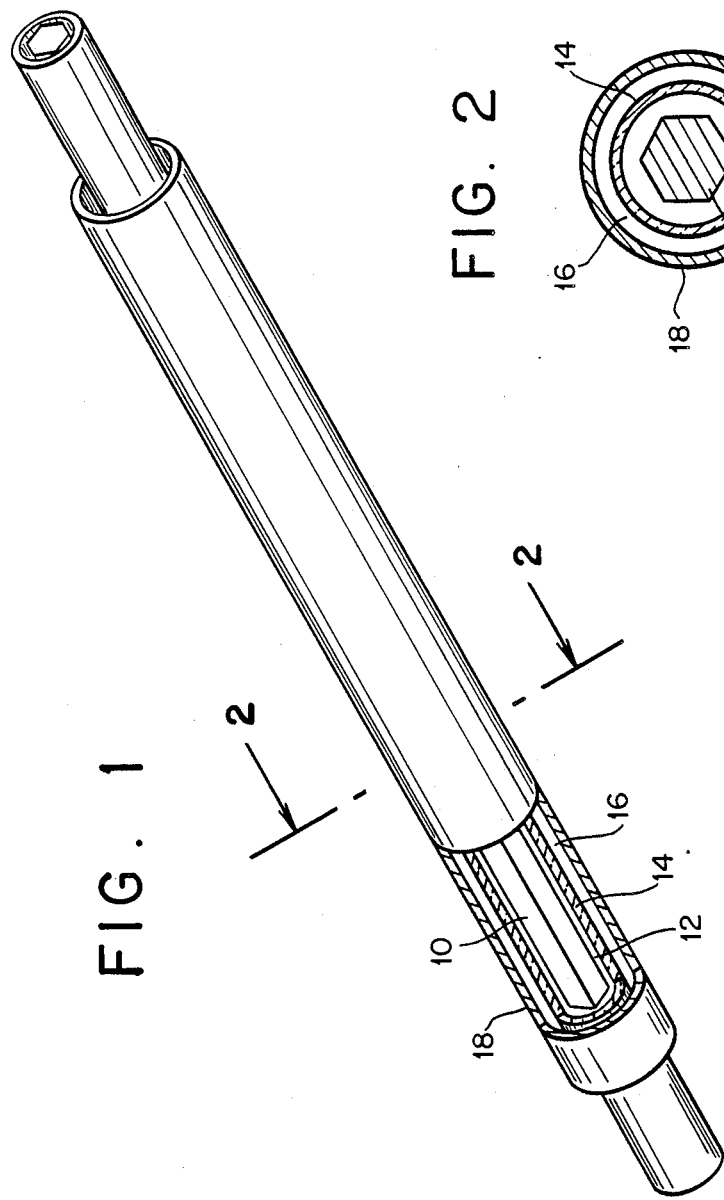

DEVICE FOR THE PRODUCTION OF OZONE

The invention relates to a device for the production of ozone in accordance with the preamble of patent claim 1.

One such device of the kind in question is disclosed in the art by German Patent Specification No. 34 22 989.

Ozone is a powerful oxidizing medium for organic as well as for inorganic compounds which contain elements having several degrees of oxidation. Of the manifold fields of ozone application in chemistry, its utilization in water purification must be mentioned. Practically speaking, however, its application potential is, owing to the high investment and operation cost associated therewith, still limited.

To date, of the myriad ways of producing ozone, silent electrical discharge has been the only method of producing ozone to gain acceptance to a significant degree.

In this connection, the art is familiar with types of ozone production based on the principle of silent electrical discharge, specifically, plate ozone generants, in which the electrodes consist of parallel plates, and tube ozone generants, in which the electrodes consist of concentric tubes.

The invention concerns itself with the latter-designated type of ozone generant having concentric tubes as electrodes. In the device pursuant to German Patent Specification No. 34 22 989 for the production of ozone known in the art and mentioned at the outset, two electrodes are provided which are separated from one another by a dielectric and a gas chamber. In accordance with this configuration, high-voltage alternating current is applied to the electrodes. Concurrently, oxygen or oxidized gas is made to pass through the gas chamber whereupon a high-voltage, non-corona-generating discharge and a brilliant light effect subsequently occurs between the electrodes. This high-voltage discharge results in the desired ozone formation.

In the device disclosed by DE-PS No. 34 22 989, the internal electrode consist of several solid wire-like and cylindircal metal bars and, moreover, the ratio of the diameter of the external electrode to the diameter of the internal electrode has been chosen to be greater than two.

The utilization of several cylindrical metal bars derives from the consideration that, by virtue of the relatively small radii given of the metal bars, a greater discharge is striven for because of the field intensity to be encountered inversely proportional to the radius. The device known in the art, in order to achieve a large discharge surface which, despite the metal bars having a small radius, is still sufficiently large, provides for several wire-like metals bars to form the internal electrode.

Even though ozone can be produced in this manner, there are still some drawbacks inherent in device known in the art. It must, for example, be pointed out that handling or the assembly of the internal electrode, by virtue of the formation of a multiplicity of cylindrical, wire-like metal bars is, in practice, very costly and complicated.

a further drawback consist in the fact that the internal electrode known in the art is capable of making only a relatively small discharge surface available because, with the multiplicity of wire-like metal bars abutting each other, the surfaces facing the center cannot be taken into consideration and area, so to speak, lost, such that only the outward facing surfaces are operative. This deficiency cannot be remedied even by increasing the number of the wire-like metal bars.

If, with the device known in the art, moreover, the ratio of the diameter of the external electrode to the diameter of the internal electrode is selected to be greater than two, then a relatively large median distance between the electrodes results. The greater the distance between the eletrodes, the greater the field intensity required or the voltage used for the silent electrical discharge must be.

The task of the invention is to devise a device for the production of ozone which does not exhibit the drawbacks described and which affords both ease of assembly and handling of the internal electrode and where, at the same time, the field intensities required for the silent electrical discharge are achieved without excessively high voltages. A further consequence thereby achieved shall be an increased degree of efficiency and a decrease in the consumption of the energy required therefor.

The invention realizes this objective for the device premised in the preamble to patent claim 1 on the basis of the features of the characterizing clause of claim 1.

A metal bar is utilized in a novel manner for the internal electrode, which metal bar is configured as a polygonal bar or even as a polygonal tube wiht more than four longitudinal edges, in particular, as a hexagon with a regular cross-sectional surface. In said configuration, the ratio of the diameter of the external electrode to the largest diameter of the internal electrode, in contrast to the device known in the art, is chosen such that said ratio is not greater than two.

The shape and size of the surface of the internal electrode, the electrical voltage applied, the shape and the size of the discharge chamber as well as the duration of the gas in the discharge chamber are the materially intrinsic parameters determining the effectiveness of a tube ozone generant based on the principle of silent electrical discharge utilizing internal electrodes, a dielectric, and external electrodes.

By means of the invention, ozone production per discharge chamber and energy efficiency are now improved by virtue of the fact that obtuse-angled edges extend over the entire length of the metal internal electrode which is preferably configured as a hexagonal bar. These edges form a very small radius such that high field intensities are generated which make it possible to apply low electrical voltage resulting in uniform gas discharge in the absence of corona discharge effects. The electrode surfaces extending between the individual edges are incorporated into the discharge.

A uniform discharge accompanied by high electrical field intensity but low voltage results, according to the invention, in the advantage that, in the production of ozone, decreased consumption of energy is required. The characteristic feature, according to which the ratio of the diameter of the external electrode to the diameter of the internal electrode is not greater than two, must be understood in this context. This results in a small distance or gap between the electrodes such that, in turn, higher field intensities are possible at lower voltages.

If, moreover, obtuse-angled edges forming a small radius with the resultant high field intensity at such edges are used as the polygonal bar or the polygonal tube for the internal electrode, then it is indeed conceivable that a right angle or even that acute angles could be used to generate yet higher field intensities. Of course, the danger would then exist that edges might tend to produce coronas which result in losses and inhibit a silent electrical discharge. This danger is eliminated when obtuse-angled edges are used.

In an expedient embodiment of the invention, the longitudinal edges of the polygonal bar do not extend rectilinearly but are, rather, twisted or turned round the longitudinal axis of the internal electrode.

By virtue of said configuration of the internal electrode, a certain vorticity of the air flow results in the discharge chamber, and it has been shown that an even better discharge can be achieved thereby.

Additional advantageous embodiments of the invention emerge from the subclaims, the description, and the drawings.

The invention will be explained in greater detail with the aid of the practical execution shown in the drawing. Shown are, in FIG. 1 a perspective, partial sectional view of a device and FIG. 2 a cross-sectional view of the device.

The device to produce ozone depicted comprises an internal electrode 10 which is configured as a metal hexagonal bar. In annular fashion an interior gas discharge chamber 12 is connected to the internal electrode 10, which gas discharge chamber is externally defined by a dielectric 14 in the shape of a glass tube.

An exterior, annular gas discharge chamber 16 follows upon the dielectric 14 to which gas discharge chamber an external electrode 18 is connected. The external electrode is formed by a metal tube and is either water- or air-cooled.

I claim:

1. Device for the production of ozone from oxidized gases by means of silent electrical discharge in an intermediate chamber through which said gas passed which chamber is formed by an annular external electrode and a voltage-conducting internal electrode which is surrounded concentrically by said external electrode, whereby a dielectric is arranged between the internal and the external electrode, wherein the internal electrode (10) consist of a polygonal rod or a polygonal tube having more than four longitudinal edges configured along the lines of a polygon and in that the ratio of the diameter of the external electrode (18) to the largest diameter of the internal electrode (10) is not greater than two.

2. Device according to claim 1, wherein the interior angles formed by the sides of the polygon of the cross-section of the internal electrode (10) amount to 120° and form a regular hexagon.

3. Device according to claim 1, wherein the longitudinal edges of the polygonal bar or polygonal tube (10) do not extend rectilinearly but are, rather, twisted or turned round the longitudinal axis of the internal electrode.

* * * * *